Sept. 19, 1939.  H. WEICHSEL  2,173,673
ELECTRIC DISTRIBUTION SYSTEM
Filed Nov. 17, 1938
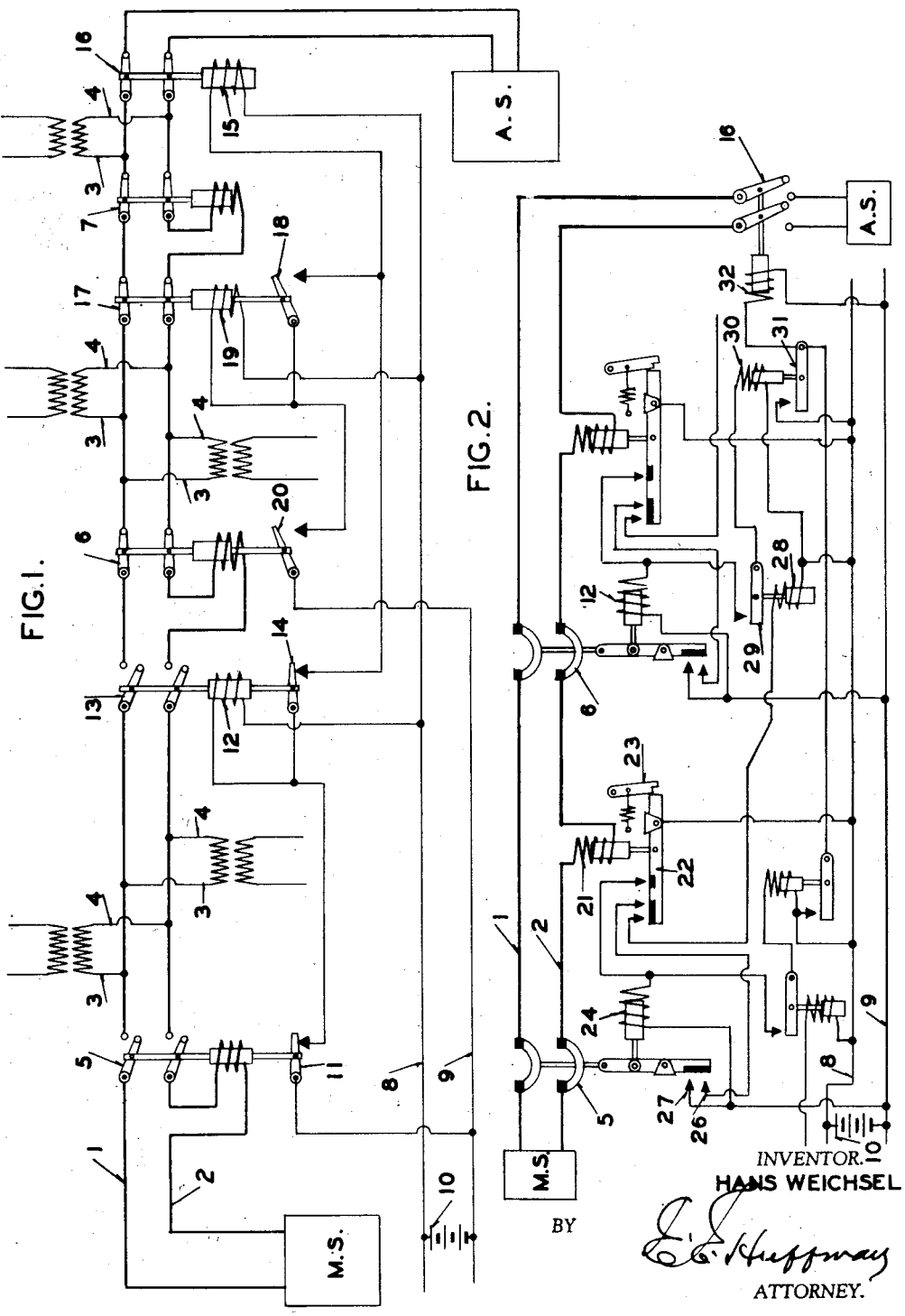
INVENTOR.
HANS WEICHSEL
BY
ATTORNEY.

Patented Sept. 19, 1939

2,173,673

UNITED STATES PATENT OFFICE 2,173,673

ELECTRIC DISTRIBUTION SYSTEM

Hans Weichsel, Webster Groves, Mo., assignor to Wagner Electric Corporation, St. Louis, Mo., a corporation of Delaware Application November 17, 1938, Serial No. 240,904

4 Claims. (Cl. 171—97)

My invention relates to electric power distribution systems, commonly referred to as "radial" systems, which comprise a main feeder circuit leading from a generating station, and branch load circuits supplied by the feeder from the generating station. When a fault (short circuit or ground) occurs in distribution systems of this type the resulting overload trips the circuit breaker at the station and the entire system is out of service until the fault can be located. The portion of the system at and beyond the fault is then disconnected from the generating station in order that the remaining part may be again supplied with current without waiting for repair of the fault.

According to a known practice, means are provided whereby the portion of a particular radial system on the opposite side of its station from the fault, may also be isolated from the fault and then connected to another generating station which is the normal supply for another radial system, but which has sufficient capacity to temporarily supply the isolated end of the first mentioned system in which the fault occurred.

Experience with distribution systems of the kind above described is that frequently large areas are without light and power for a considerable time since neither the normal supply station nor an auxiliary substation can be connected to the operative parts of a radial system until the fault is located and isolated. It is the object of my invention to provide means, comprising overload circuit breakers, for automatically isolating a fault and connecting the substation which serves as "standby" for a particular radial system, to the portion of that system which, during the time of isolation of the faulty section, cannot be supplied from the station which normally supplies it.

In the drawing Figure 1 diagrammatically illustrates an embodiment of my invention, and Figure 2 shows a modification as to switching means. The heavy lines 1 and 2 indicate the main feeder (single phase being illustrated for convenience) supplied from a source marked "M. S." and which may be either a power generating station or a transformer substation. In the following description it is referred to as the "main source" in relation to the particular radial distribution system illustrated. The leads 3—4 indicate the light and power load circuits connected to the feeder line through voltage reduction transformers. The numerals 5, 6 and 7 indicate overload circuit breakers for interrupting the main feeder on occurrence of predetermined overload. These breakers are considerably spaced apart in the system and in most instances one or more load circuits would be connected to the main feeder between each circuit breaker and the next succeeding one. "A. S." represents another substation which serves as an auxiliary substation with respect to the particular radial system illustrated.

The means for isolating a fault occurring in the main feeder system consists of what is referred to herein as a "control circuit" whose main positive and negative leads 8 and 9 are supplied from an independent source of current, such as battery 10. The purpose of this control circuit is to isolate a section of the main feeder in which a fault occurs and to simultaneously cause the part of the radial system beyond the fault (with reference to the main station) to be connected to the auxiliary station. This control circuit is normally open but if we assume occurrence of a "fault" at a point between circuit breakers 5 and 6, for example, the overload resulting therefrom causes circuit breaker 5 to open and the opening of this breaker closes switch 11, thereby establishing the circuit shown through coil 12 which operates breaker 13 and opens the feeder at that point. When breaker 13 is operated, switch 14 is simultaneously operated whereby battery 10 is placed in circuit with solenoid 15 which closes switch 16, thereby connecting the auxiliary service station to the main feeder at the point indicated.

The result of the operations just described is that when the fault occurs at the point mentioned, the only part of the radial system which will remain out of service while repairs are being made, is the part between the breakers 5 and 13.

In a similar manner switches 17 and 18 will be operated by solenoid 19 if the fault occurs between circuit breakers 6 and 7, since the operation of breaker 6 closes switch 20, thereby energizing coil 19 to open switch 17 and close switch 18. The current rating of the circuit breakers in the main feeder will be so chosen that if a fault occurs in the section between breakers 6 and 7, circuit breaker 5 will not open and, therefore, all of the system between the main station and breaker 6 will remain in operation.

It is, of course, possible to so combine the switching arrangement that switches 13 and 17 need not be employed, the coil 12 of switch 13 being utilized to open breaker 6. This combination is illustrated in Figure 2.

For simplicity the branch load circuits are not shown in Figure 2 and it will be sufficient to the understanding of the circuits of this figure to describe conditions resulting from a fault in the section of the main feeder between breakers 5 and 6. The overload resulting from this fault causes series coil 21 to actuate switch arm 22, closing the circuit contacts shown, this arm being held in closed position by latch 23.

It will be noted that with switch 22 in closed position, a battery energized circuit is established through coil 24 which opens breaker 5, and that the opening of this breaker causes contacts 26 and 27 to be connected and coil 28 to be energized, whereby switch arm 29 is moved upward, closing a battery circuit through coil 12 which operates circuit breaker 6. Coil 30 is also energized when switch 29 is closed and switch 31 is thereby closed to establish a battery circuit through coil 32 which closes switch 16 and connects the auxiliary station to the portion of the system beyond the fault.

From the explanation just given it will be apparent how the circuits of Figure 2 are duplicated in order to isolate any faulty section in a radial system embodying a plurality of sections. If we assume, for example, that the section of the system at the right of breaker 6 is the terminal section, it will be noted that occurrence of a fault in this section would not result in the closing of switch 16 to the auxiliary source because no current would be established through coil 32 when circuit breaker 6 opens.

Having fully described my invention, what I claim as new and desire to secure by Letters Patent of the United States is:

1. An electric distribution system comprising a main feeder circuit and a plurality of load circuits connected in parallel to a main current supply source by said feeder, overload circuit breakers at spaced points in said feeder, a control circuit inoperative during existence of normal conditions in the distribution system, and means automatically rendering said control circuit operative when a selected overload circuit breaker in the feeder opens, said control circuit being provided with means functioning, when the control circuit is operative, to open the feeder circuit at a point removed from the last mentioned circuit breaker and thereby isolate a section of the feeder, said control circuit also being provided with means operating to connect a source of current to a part of the main feeder which is separated from the main source by the isolated section.

2. An electric distribution system comprising a main feeder circuit and a plurality of load circuits connected in parallel to a main current supply source by said feeder, overload circuit breakers at spaced points in said feeder, and auxiliary source of current supply, a control circuit inoperative during existence of normal conditions in the distribution system, and means automatically rendering said control circuit operative when a selected overload circuit breaker in the feeder opens, said control circuit being provided with means functioning, when the control circuit is operative, to open the feeder circuit at a point removed from the last mentioned circuit breaker and thereby isolate a section of the feeder, said control circuit also being provided with means operating to connect the auxiliary source of supply to a part of the main feeder which is separated from the main source by the isolated section.

3. An electric distribution system comprising a main feeder circuit and a plurality of load circuits connected in parallel to a main current supply source by said feeder, overload circuit breakers at spaced points in said feeder, an auxiliary source of current supply, a control circuit open during existence of normal conditions in the distribution system, and means automatically closing said control circuit when a selected overload circuit breaker in the feeder opens, said control circuit being provided with means functioning, when the control circuit is energized, to open the feeder circuit at a point removed from the last mentioned circuit breaker and thereby isolate a section of the feeder, said control circuit also being provided with means operating upon energization of said circuit to connect the auxiliary source of supply to a part of the main feeder which is separated from the main source by the isolated section.

4. An electric distribution system comprising a main feeder circuit, a plurality of load circuits connected in parallel to a main current supply source by said feeder, overload circuit breakers in said main current on opposite sides of the point of connection of a load circuit to the main circuit, an auxiliary source of load current, a control circuit comprising an independent source of current and open under normal conditions in the distribution system, means for automatically closing said control circuit when the overload circuit breaker nearest the main source of supply opens, said control circuit being provided with means functioning when said control circuit is energized to open the feed circuit at a point further removed from the source than the first mentioned circuit breaker and beyond the point of connection of one of the load circuits of the main circuit, and said control circuit also being provided with means operating when said control circuit is energized to connect the auxiliary source of supply to the part of the main feeder circuit beyond the last mentioned point of interruption of said circuit.

HANS WEICHSEL.